United States Patent [19]

Maisenbacher et al.

[11] Patent Number: 4,818,067
[45] Date of Patent: Apr. 4, 1989

[54] FIBER OPTIC FOCUSING DEVICE

[75] Inventors: Bernd Maisenbacher, Friendenstr; Rudolf Vozdecky, Schwarzwaldstr, both of Fed. Rep. of Germany

[73] Assignee: Hewlett-Packard Company, Palo Alto, Calif.

[21] Appl. No.: 40,894

[22] Filed: Apr. 21, 1987

[30] Foreign Application Priority Data

Apr. 23, 1986 [DE] Fed. Rep. of Germany ....... 3613643

[51] Int. Cl.⁴ ................................................ G02B 7/04
[52] U.S. Cl. ..................................... 350/255; 350/252
[58] Field of Search ............... 350/247, 252, 255, 320, 350/633; 74/55; 372/107–109

[56] References Cited

U.S. PATENT DOCUMENTS

| | | | |
|---|---|---|---|
| 3,751,139 | 8/1973 | Malherbe | 372/107 |
| 4,408,830 | 10/1983 | Wutherich | 350/247 |
| 4,589,744 | 5/1986 | Kimura et al. | 350/252 |

OTHER PUBLICATIONS

Dickson et al., "Laser Beam Expander & Focusing Lens System", IBM Tech. Disc. Bull., 4-1975, p. 34114.

Primary Examiner—John K. Corbin
Assistant Examiner—Martin Lerner
Attorney, Agent, or Firm—Douglas A. Kundrat

[57] ABSTRACT

A fiber optic focusing device allows fine adjustment of the focal point along the optical axis without causing tilting of the focusing lens system. Roughly perpendicular setscrews engaging opposing inclined surface urge the lens system along the optical axis.

7 Claims, 1 Drawing Sheet

FIBER OPTIC FOCUSING DEVICE

BACKGROUND AND SUMMARY OF THE INVENTION

A fiber optic focusing device may be used to focus a parallel light beam onto the end of a glass fiber. In prior art focusing devices, a focusing lens is typically held in a threaded focusing ring which is itself threaded into a holder. Focus adjustments are made by rotating the ring within the holder to move the lens along the optical axis. In such prior art devices, the use of threads often causes tilting of the lens during rotation. In addition, it is often very difficult to lock the lens in a desired position with sufficient accuracy.

In accordance with the illustrated preferred embodiment of the present invention, a fiber optic focusing device is smoothly adjustable without lens tilting. The device includes a lens system that is linearly displaceable along the optical axis to permit focus adjustments. The lens system is held by a holder which is itself contained within a frame. Setscrews in the frame roughly perpendicular to the optical axis engage the holder to displace it along the optical axis as desired. For enhanced accuracy, the setscrews may include microthreads and may be guided in corresponding threaded bores. In addition, the frame may include a clamping screw for locking the holder in position relative to the frame. Since the lens system is fixed rigidly in the holder and the holder is seated in a precise parallel guide without tilting, the focusing device may be adjusted with a high degree of precision.

DETAILED DESCRIPTION OF THE PREFERRED EMBODIMENT

Figure 1:
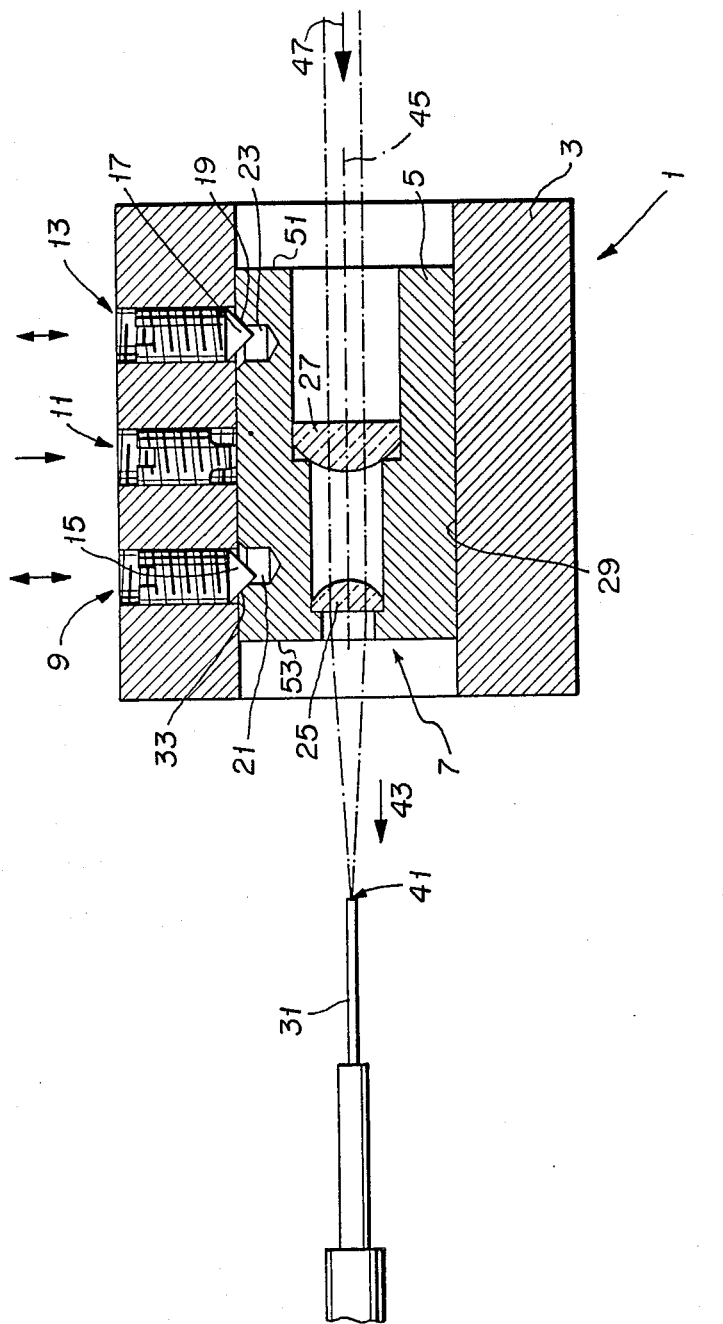
FIG. 1 shows a fiber optic focusing device that is constructed in accordance with the preferred embodiment of the present invention.

FIG. 1 shows a fiber optic focusing device 1 that is constructed in accordance with the preferred embodiment of the present invention. The device 1 includes a frame 3 containing a holder 5 and a lens system 7 which may be displaced along the optical axis 45. The frame 3 provides an exact guide for axial displacement of the holder 5 and the lens system 7. Conical points 15, 17 of setscrews 9, 13 engage adjusting bores 21, 23 to provide axial displacement of the holder 5. A clamping screw 11 may be used to fix the position of the holder 5.

The lens system 7 consists of two plano-convex lenses 25, 27 which are fixed in the holder 5 and which are used to focus exactly a parallel light beam 47 onto the end of a glass fiber 31. The two setscrews 9, 13 may be used to displace the holder 5 along a defined axial path until the focus is set to the desired degree of accuracy. For example, when the setscrew 9 is turned inwards the tapered end of its conical point 15 engages an inclined surface 33 of the funnel shaped adjusting bore 21. This engagement causes the holder 5 to move in the direction 43 so that the focal point 41 is displaced as desired. Of course, both the setscrew 13 and the clamping screw 11 must be loosened prior to adjusting the setscrew 9. The setscrew 13 may be used to displace the focal point 41 in the opposite direction since turning the setscrew 13 inwards causes its point 17 to engage an inclined surface 19 of bore 23. The amount of adjustment caused by the setscrews 9, 13 may be changed by changing the angle of inclination between the optical axis 45 and the inclined surfaces 33, 19.

After the focal point 41 is accurately positioned, the holder 5 may be locked in position with the clamping screw 11. Tilting of the holder 5 is avoided since both of the setscrews 9, 13 urge the holder 5 against the same surface 29.

As discussed above, the setscrews 9, 13 may act against inclined surfaces 19, 33. Alternatively, the tapers of points 15, 17 may act against the end faces 51, 53 of the holder 5 if the end faces 51, 53 are inclined in a manner similar to the inclination of surfaces 33, 19. In either case, the angle of inclination relative to the optical axis should lie between 40 degrees and 80 degrees. Fine adjustments can be achieved by orienting the setscrews 9, 13 perpendicularly to the optical axis 45 so that a large setscrew movement causes only a fine axial displacement of the holder 5 if the angle of inclination is relatively steep. The ends of the setscrews 9, 13 may be set to the same angle of inclination as the associated inclined surfaces 19, 33.

We claim:

1. An optical device for focussing a light beam along an optical axis, comprising:
   a lens element;
   holder means for holding the lens element aligned with the optical axis, the holder means having opposing upper and lower surfaces parallel to the optical axis;
   first and second conical bores positioned in the upper surface of the holder means;
   frame means for holding the holder means aligned with the optical axis, the frame means having opposing internal upper and lower surfaces parallel to the optical axis and engageable with the upper and lower surfaces of the holder means;
   first and second threaded bores positioned through the upper surface of the frame means for receiving first and second setscrews; and
   wherein the setscrews include conical points for engagement with the first and second conical bores, such that engagement of the first setscrew with the first conical bore causes motion of the lens element in one direction along the optical axis and engagement of the second setscrew with the second conical bore causes motion of the lens element in an opposite direction along the optical axis.

2. An optical device as in claim 1, wherein the distance between the first and second conical bores is different from the distance between the first and second threaded bores.

3. An optical device as in claim 2, wherein the threaded bores are substantially perpendicular to the optical axis.

4. An optical device as in claim 3, wherein:
   the sides of each of the conical bores and conical points diverge from the perpendicular relative to the optical axis by a divergence angle; and
   the divergence angle is between 40 degrees and 80 degrees.

5. An optical device as in claim 4, further comprising a third threaded bore through the upper surface of the frame means for receiving a clamp screw, such that engagement of the clamp screw in the third threaded bore securely forces the lower surface of the holder means against the lower surface of the frame means and thereby precludes movement of the lens system along the optical axis.

6. An optical device as in claim 5, wherein the third threaded bore is positioned between the first and second threaded bores.

7. An optical device as in claim 1, wherein the lens element comprises a plano-convex lens.

* * * * *